United States Patent
Veeser et al.

(10) Patent No.: US 6,656,400 B2
(45) Date of Patent: Dec. 2, 2003

(54) METHOD FOR PRODUCING A PLEATABLE FILTER MATERIAL FROM A NONWOVEN FABRIC

(75) Inventors: Klaus Veeser, Weinheim (DE); Anthony Hollingsworth, Birkenau (DE); Dirk Dantz, Weinheim (DE)

(73) Assignee: Firma Carl Freudenberg, Weinheim (DE)

( * ) Notice: Subject to any disclaimer, the term of this patent is extended or adjusted under 35 U.S.C. 154(b) by 308 days.

(21) Appl. No.: 09/819,885

(22) Filed: Mar. 28, 2001

(65) Prior Publication Data

US 2001/0050136 A1 Dec. 13, 2001

(30) Foreign Application Priority Data

Mar. 31, 2000 (DE) .......................... 100 16 182

(51) Int. Cl.[7] .......................... B29C 53/06; B32B 3/26; B32B 31/20

(52) U.S. Cl. .................. 264/134; 264/136; 264/137; 264/171.1; 264/172.14; 264/172.15; 264/285; 264/286

(58) Field of Search ................ 264/134, 136, 264/137, 171.1, 172.14, 172.15, 285, 286

(56) References Cited

U.S. PATENT DOCUMENTS 3,531,920 A 10/1970 Hart
6,146,436 A * 11/2000 Hollingsworth et al. ...... 55/486

FOREIGN PATENT DOCUMENTS

| DE | 196 30 522 A1 | 2/1988 |
| DE | 695 09 610 T2 | 9/1999 |
| EP | 0 429 805 A2 | 6/1991 |
| EP | 0 498 002 A1 | 8/1992 |

* cited by examiner

Primary Examiner—Leo B. Tentoni
(74) Attorney, Agent, or Firm—Kenyon & Kenyon

(57) ABSTRACT

A method for producing a pleated filter material from a nonwoven fabric having spacers for the pleated folds formed from the filter material itself, a formed fabric made of stretched synthetic fibers and thermoplastic and/or thermally cross-linked binding agent being heated in an oven to a temperature lying at least in the softening temperature range and/or the cross-linking temperature range of the binding agent, and subsequently, the formed fabric being formed between profiled calender rolls and cooled simultaneously.

22 Claims, 3 Drawing Sheets

METHOD FOR PRODUCING A PLEATABLE FILTER MATERIAL FROM A NONWOVEN FABRIC

FIELD OF THE INVENTION

The present invention relates to a method for producing a pleatable filter material from a nonwoven fabric, having spacers for pleated folds made of the filter material itself.

BACKGROUND INFORMATION

A method for producing a pleated filter medium with stamped protrusions is described, for example, in U.S. Pat. No. 3,531,920. According to this method, the filter material is passed from a roll to a press which includes two heated cylinders rotating in opposite directions. The cylinders are provided with meshing protrusions and the corresponding recesses, and the filter material passed through between them is durably shaped by deep-drawing. The shaping process influences the structure of the filter material in the deep-drawn area, and thereby changes the original filtering properties in the areas important to the filtering.

An improvement in the method described above is achieved by the method described in European Published Patent Application No. 0 429 805. In this method, a flat filter medium is gathered transversely to the running direction by rolls, and subsequently, elongated protrusions are stamped into the gathered material by the dies of a shaping device. The gathering prevents the additional material, required by the stamped protrusions, from leading to tensions in the material and the structure from being changed in the deep-drawn area of the filter medium. But this method also has the disadvantage that the spacers formed by stamping can only be impressed over a part of the filter surface.

German Published Patent Application No. 196 30 522 describes scoring and bonding a formed fabric made of stretched and unstretched synthetic fibers between profiled calender rolls. By this method a filter material could be produced from a nonwoven fabric without having a change in the homogeneity of the nonwoven fabric appear. The desired scoring is, however, not fully satisfactory, because outside the calender rolls it is partially leveled again by the tractive force toward the material transport.

SUMMARY

Therefore, it is one object of the present invention to provide a method for producing a filter material in which the finished filter material has great stability. The formed spacers should keep their shape and show great stability, both during the production process and in later filtering operation, under the influence of mechanical and/or thermal stress.

The above and other beneficial objects of the present invention are attained by providing a method in which a formed fabric made of stretched synthetic fibers and a thermoplastic and/or thermally cross-linked binding agent is heated in an oven to a temperature that is at least in the softening temperature range and/or the cross-linking temperature range of the binding agent, and in which, subsequently, the formed fabric is formed between profiled calender rolls and cooled simultaneously. This method yields a filter material with the utmost stability and shape-retaining ability, the filtration properties being maintained simultaneously to the highest degree.

The stretched synthetic fibers are required in order to provide the filter material generally with the desired firmness. The binding agent is applied to attain a stable structure of the fibers among one another. This may require the use of a thermoplastic as well as a thermally cross-linking binding agent. The temperature applied to the formed fabric in the oven is set so that, in a formed fabric having a thermoplastic binding agent, the softening temperature range of the binding agent is at least reached. Consequently, the single fibers are connected to one another by the binding agent.

In the case of a thermally cross-linking binding agent, the oven temperature is raised until the cross-linking temperature range is reached, in which controlled cross-linking occurs. The cross-linking is taken to the point at which a stable structure of the formed fabric is present. The formed fabric thus treated is then delivered to the calender rolls, which have a lower temperature than the oven temperature. During calendering, the formed fabric is cooled and simultaneously formed, that is, the spacers are put in. After leaving the calender rolls, the formed fabric has a very high remaining stability.

The method of producing the formed fabric and putting in a thermoplastic binding agent may include the step of adding bicomponent fibers having a thermoplastic fiber component into the nonwoven fabric during its production. For this purpose, suitable bicomponent fibers are fibers having a core structure, a sheath structure, an island structure or a side-by-side structure. The bicomponent fibers may be introduced into the formed fabric by mixing the fiber components or by including them in the formed fabric. By heating in the oven, the thermoplastic component of the bicomponent fibers is softened or melted, and the desired connection of the fibers in the formed fabric occurs.

The temperature may be selected so that at least softening or fusing of the binding component occurs. This is normally reached in the range between 90° C. and 240° C. The desired connection of the fibers is caused by the melting and resolidification of the polymer while cooling in the calender.

It is also possible to use thermoplastic binding agents or cross-linking binding agents in another, e.g., powder, dispersion, solution, which are introduced into the formed fabric or applied to the formed fabric. The latter, for example, may be accomplished by spraying the binding agent onto the formed fabric. Alternatively, the binding agent may be introduced into the formed fabric by steeping or impregnating.

The oven temperature is set so that the connecting process occurs reliably in as short a time as possible. The temperature is set to the softening temperature range or to the melting point range according to the type of thermoplastic binding agent. Generally, the oven temperature is set to between 100° C. and 240° C. depending on the binding agent to be used. With a core/sheath structure of the bicomponent fibers, a temperature is selected which is below the melting point of the core, but a reading of 25° C. below the melting point of the core component should not be exceeded. The sheath is heated to its own melting temperature, and this results in a good bonding of the sheath layer.

The temperature of the calender rolls is selected to be below the softening temperature range of the binding agent. In general, the temperature range is approximately 70° C. to 150° C. In order to make the procedure as simple as possible, a temperature range of 80° C. to 90° C. may be used. The temperature of the roller has to cool the formed fabric so that durable forming can be achieved. The temperature of the calender rolls and the residence time of the formed fabric between the calender rolls is to be set corresponding to the binding agent.
}

In addition to the shaping of the unbonded formed fabric into a three-dimensional structure, a calibration of the formed fabric as to uniform thickness in the calender occurs at the same time. Even though the formed fabric is already losing volume under the effect of heat in the oven, the final calibration occurs only between the calender rolls.

One example embodiment of the present invention provides that the preformed fabric is pressed together uniformly by the calender rolls without inhomogeneities occurring on its surface. The desired spacers may be of various specific embodiments. The example embodiment provides that the spacers are formed as a sine-shaped wave in the filter material. The wave crests and troughs are arranged in the direction of travel.

Profiled calender rolls are used for this, as described, for example, in German Published Patent Application No. 196 30 522. The scoring is uniform over the entire cross-section, and the filter material also has a uniform thickness. However, by using an equivalent formation of the calender rolls, it is also possible to submit the formed fabric to an increased compression at predefined areas of the cross-section, so as to achieve a greater stiffness in the filter material at these locations.

Formation of the spacers is also possible by elevations and/or indentations set apart from one another. Particular filter materials may be made in this manner, and various geometries are possible.

The scoring or elevations in the filter material may be selected in accordance with the ultimate use of the filter material. In general, their height should correspond to at least a quarter of the thickness of the filter material.

DETAILED DESCRIPTION

Figure 1:
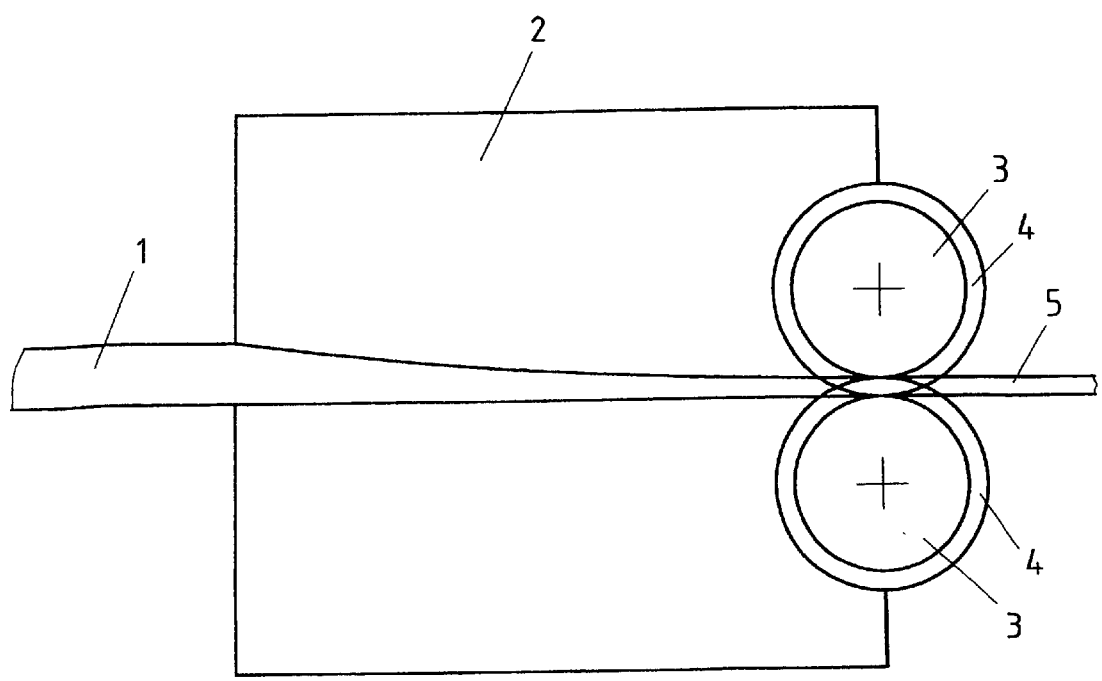
FIG. 1 is a schematic view of the throughput of the formed fabric through an oven with calender rolls.

In FIG. 1, the method is illustrated schematically. The formed fabric 1 is delivered to the oven 2 and heated therein. Heating may be performed with hot gas, e.g., air, an infrared radiation device, other devices, a combination thereof, etc. The thermoplastic binding agent contained in the formed material 1 is heated by the heating process to the point where at least its softening temperature is reached. As shown in FIG. 1, the formed fabric 1 is then compressed, so that the formed fabric 1 is diminished in thickness. The calender rolls 3 rotate in opposite directions and are provided with surface profiling 4.

This profiling is wave-shaped, the crest of one calender roll 3 being aligned with the trough of the other calender roll 3. The clearance of the individual calender rolls 3 from each other is selected so that the formed fabric 1 is not fully compressed and so that there is a clearance between the rolls 3 for the cross-section of the formed fabric 1. This clearance determines the thickness of the filter material 5, which is formed from the formed fabric 1 after exiting the calender rolls 3.

Figure 2:
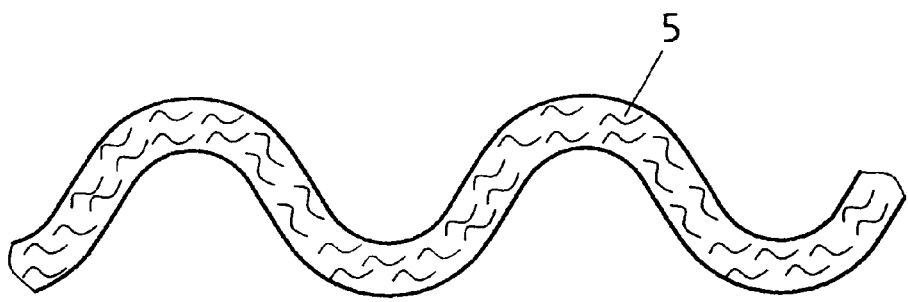
FIG. 2 is a cross-sectional view of scored filter material.

In FIG. 2, a section of filter material 5 is shown in cross-section. This enlarged and schematic illustration reflects that filter material 5 has received a scored structure from the rolls 3, which remains substantially even over the entire cross-section of filter material 5. From this filter material 5, a pleated filter may be made, by folding, in which the scoring acts as the spacer.

Figure 3:
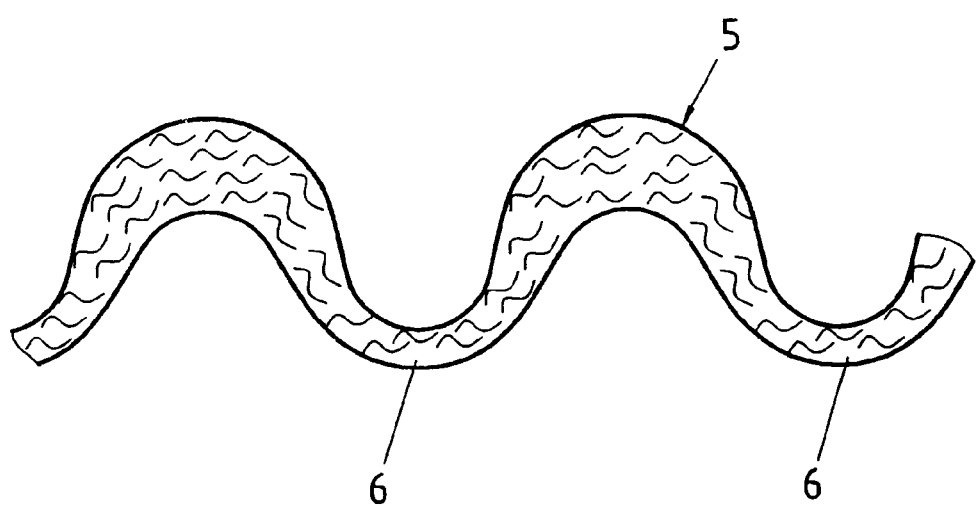
FIG. 3 is a cross-sectional view of another form of scored filter material.

FIG. 3 shows a part of the filter material in cross-section in the same way as in FIG. 2. In this filter material 5, cross-sectional regions 6 are present, which were subjected to stronger compression. These may be attained, for example, by having the wave edges of the one roller protrude upward more than the roll edges of the other, opposed roller.

What is claimed is:

1. A method for producing a pleatable filter material from a nonwoven fabric having spacers for pleated folds formed from the filter material, comprising the steps of:

heating a formed fabric in an oven to a predetermined temperature, the formed fabric including stretched synthetic fibers and at least one of a thermoplastic and a thermally cross-linked binding agent, the predetermined temperature being within at least one of a softening temperature range and a cross-linking temperature range of the binding agent; and after the heating step, simultaneously forming the formed fabric between profiled calender rolls and cooling the formed fabric to form a pleatable filter material.

2. The method according to claim 1, wherein the thermoplastic binding agent includes bicomponent fibers having a thermoplastic fiber component.

3. The method according to claim 2, further comprising the step of introducing the bicomponent fibers into the formed fabric by one of mixing, melting and spinning the bicomponent fibers into the formed fabric.

4. The method according to claim 1, further comprising the step of applying the binding agent to the formed fabric in a different form.

5. The method according to claim 1, further comprising the step of introducing the binding agent into the formed fabric in a different form.

6. The method according to claim 1, further comprising the step of spraying the binding agent onto the formed fabric.

7. The method according to claim 1, further comprising the step of introducing the binding agent into the formed fabric by one of steeping and impregnating.

8. The method according to claim 1, wherein the predetermined temperature is within a melting temperature range of the binding agent.

9. The method according to claim 1, wherein the predetermined temperature is between 100° C. and 240° C.

10. The method according to claim 9, wherein the predetermined temperature is approximately 200° C.

11. The method according to claim 1, wherein a temperature of the calender rolls is below the softening temperature range of the binding agent.

12. The method according to claim 1, wherein a temperature of the calender rolls is between 70° C. and 150° C.

13. The method according to claim 12, wherein the temperature of the calender rolls is between 80° C. and 90° C.

14. The method according to claim 1, wherein the forming step includes the substep of uniformly compressing the formed fabric with the calender rolls without producing inhomogeneities.

15. The method according to claim 14, wherein the forming step includes the substep of scoring the filter material to define spacer mounting in a pleated expansion bellows.

16. The method according to claim 1, wherein the forming step includes the substep of subjecting the formed fabric to increased compression by the calender rolls in predetermined cross-sectional regions.

17. The method according to claim 16, wherein the spacers are defined by elevations disposed at a distance from one another.

18. The method according to claim 17, wherein a height of the elevations corresponds to at least one quarter of a thickness of the formed fabric.

19. The method according to claim 15, wherein a height of the scoring corresponds to at least one quarter of a thickness of the formed fabric.

20. The method according to claim 1, further comprising the step of calibrating the calender rolls in accordance with the formed fabric.

21. The method according to claim 1, wherein a mass per unit area of the formed fabric is approximately 60 to 400 $g/m^2$.

22. The method according to claim 21, wherein the mass per unit area is approximately 200 $g/m^2$.

* * * * *